(No Model.)
P. VAN GELDER & W. P. THOMPSON.
DUST OR SOOT COLLECTING MACHINE.
No. 522,700. Patented July 10, 1894.
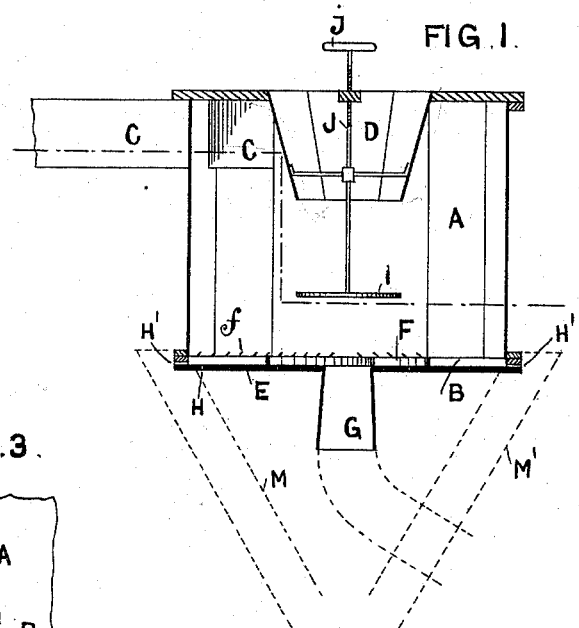
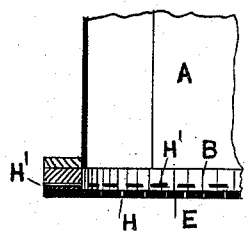
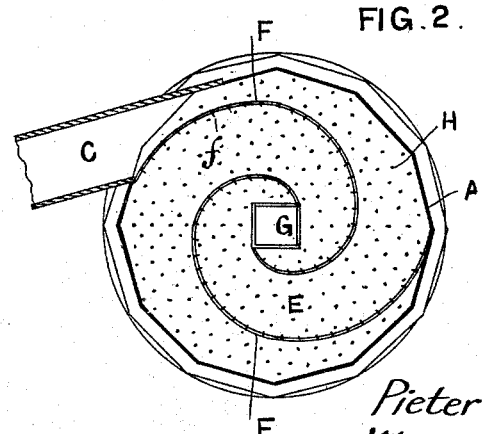
Witnesses:
Horace A. Dodge.
C. B. Bull.
Pieter Van Gelder
William P. Thompson
Inventors:
by Dodge & Son,
Attys.
THE NORRIS PETERS CO., PHOTO-LITHO., WASHINGTON, D. C.

United States Patent Office.

PIETER VAN GELDER AND WILLIAM P. THOMPSON, OF LIVERPOOL, ENGLAND; SAID VAN GELDER ASSIGNOR TO SAID THOMPSON.

DUST OR SOOT COLLECTING MACHINE.

SPECIFICATION forming part of Letters Patent No. 522,700, dated July 10, 1894.

Application filed February 16, 1893. Serial No. 462,625. (No model.) Patented in France November 9, 1891, No. 207,941; in England November 22, 1892, No. 21,218; in Belgium February 24, 1893, No. 103,602; in Italy June 30, 1893, XXVII, 34,023, LXVI, 432, and in Austria-Hungary August 29, 1893, No. 24,506 and No. 39,876.

*To all whom it may concern:*

Be it known that we, PIETER VAN GELDER, a subject of the Queen of the Netherlands, and WILLIAM PHILLIPS THOMPSON, a subject of the Queen of Great Britain, residing at Liverpool, England, have invented certain new and useful Improvements in Dust or Soot Collecting Machines, (for which we have received Letters Patent as follows: in England, No. 21,218, dated November 22, 1892; in France, dated February 25, 1893, as a patent of addition to French Patent No. 207,941, of November 9, 1891; in Belgium, No. 103,602, dated February 24, 1893; in Austria-Hungary, No. 24,506 and No. 39,876, dated August 29, 1893, and in Italy, XXVII, 34,023, and LXVI, 432, dated June 30, 1893,) of which the following is a specification.

This invention has for its object a machine applicable to the separation of dust and soot from air, and the separation of cotton-seed and dust as they come from a scutching machine.

It is best described by aid of the drawings, in which—

Figure 1 is a vertical sectional view; Fig. 2, a horizontal sectional view; and Fig. 3, a sectional view of a portion of the casing, on a larger scale.

A is a prismatic or cylindrical separating chamber, but preferably twelve sided with vertical walls.

B indicates a small portion of the sides, which is formed cylindrically.

C is the inlet for the dust-laden air, which is usually made parallel with the contiguous side as shown; in a cylindrical machine it is made tangential.

D is a pyramidal exit for the purified air located at the center of the top of the machine. This exit may be cylindrical or conical, but we prefer to make it hexagonal in cross section.

E is the floor of the chamber and G is the exit for the dust, located centrally in the floor. This exit is preferably square or angular in cross section, for unless it be trapped, there will be a powerful up-current, which is liable to interfere with the descending dust and carry it up again. Where, however, the exit is made angular, the dust escapes at the corners, while the air that enters forms a vortex up the center.

F indicates spiral ribs, usually about an inch high, and thus wholly below the air inlet and incapable of affecting the whirling air within the chamber. Where the machine is employed for removing the dust from the cotton of scutching machines, these ribs will be provided with small teeth or spikes *f* projecting upward and forward in the direction of the current.

H H indicate perforations in the floor of the chamber, and H' H' indicate perforations in the cylindrical portion B of the walls, close to the floor.

Where the side perforations H' are used, a hopper M' is employed to inclose the sides at this point, as indicated by dotted lines in Fig. 1, so as to bring the dust down to a central point; while the perforations H discharge into a similar hopper M.

J is a stem suspended preferably from above and provided with a hand wheel *j* by means of which it may be adjusted vertically.

Secured to the lower end of the stem is a disk I which is preferably about the same diameter as the lower end of the air exit D, and which is employed to prevent a strong in-draft of air up the exit.

When the machine is used for taking the material from a cotton-scutching machine, the mixed air, cotton, and dust are driven in through the inlet C at the velocity of from fifteen hundred to five thousand feet per minute. The centrifugal force causes the solid materials to fly outward against the walls of the chamber, while the lighter air escapes through the outlet D. The effect of the corners formed by the junction of the twelve sides is to produce quiet places down which the dust trickles. Arriving at the bottom or lower end of these angles or corners, the dust comes upon the cylindrical portion B which prevents the accumulation of dust which would otherwise take place at these points. After reaching this cylindrical portion, the dust flies along until it comes to one of the ribs F along which it travels to the outlet G. The large pieces of cotton, however, fly over the low ribs, but the teeth or spikes *f* thereon tear off small pieces until the entire ball of cotton is torn down to a sufficient size to be caught by the rib and directed to the exit spout G. If perforations H',—and they are preferably long narrow slits,—are used, a portion of the dust passes therethrough and into hopper M', but the long staple cotton cannot thus escape and continues on to the central discharge G. The perforations H are circular and of larger size, and through them and into the hopper M pass the larger dirt, cotton seed, &c.

Where the machine is employed to separate dust or soot from air, the teeth or spikes *f* and the openings H H' and their hoppers M M' need not be employed.

In the drawings we have shown only a chamber polygonal in cross section, as we have found this to be the best in practice, but this is not essential, however.

It is desirable that the depth of the cylinder should be such that the dust goes through a course of only three hundred and sixty degrees, before leaving the chamber; and it is also desirable that there shall be impediments or obstructions to the current, projecting slightly from the walls. We have found that a series of laths placed at intervals down the sides do moderately well, but if the laths be made with a rounded back and a flat face, and of such width that twelve of them will fit within the cylinder and thereby convert the chamber into a polygon of twelve sides, the best results appear to be obtained. We have found also that it makes little difference whether the chamber be a true cylinder or have its sides inclined slightly.

We are aware of the patent to Morse, No. 468,935, in which there is a cylindrical chamber corrugated spirally, and provided in the bottom with a dust discharge at the periphery; of the patent to Curtis, No. 420,296, also having the peripheral dust discharge, and to such structures we make no claim. In both of these machines there are present devices for directing the dust-laden air-current as it enters the machine. In one, these devices cause repeated travels of said current around and within the chamber, while in the other the dust laden air is forced downward immediately to the peripheral dust-discharge outlet.

We are further aware of the patent to Kutsche, No. 458,550, in which the separating chamber is provided with a conical extension such as has long been in use, and this structure we also disclaim.

We are not aware, however, that anyone prior to our invention has proposed a separator comprising a substantially-cylindrical separating-chamber free from obstructions which would interfere with the travel of or direct the dust-laden air-current to a given point; a tangential air inlet, a central dust outlet; and an escape for the purified air.

By making the separating chamber of a diameter as great as or greater than its vertical measurement, we secure two important results: first, we cause the dust laden air to travel through a course of only three hundred and sixty degrees; and second, we are enabled to place our machine wholly between two floors of the mill.

What we do claim is—

1. In a dust collector the combination with a substantially cylindrical separating chamber having an air-inlet and an air-outlet at one end, and a central dust-outlet at the opposite end; of low ribs upon the floor of the chamber,—wholly below the air-inlet,—adapted to direct the dust to the dust-outlet without impeding the travel of the air-current.

2. In a dust collecting apparatus, a substantially cylindrical separating chamber in which the dust laden air forms a vortex or whirling body, having a horizontal floor provided with a central orifice for the dust to escape, and guiding devices formed of low strips, wholly below the air inlet, for guiding the dust to that orifice; whereby, while the dust is guided, the air above has free passage and no appreciable guide or impediment except the walls of the chamber, and the dust orifice being at the center of the vortex, the air has no tendency to descend with the dust.

3. In a dust collector, the combination of a chamber such as described having impediments on its periphery such as described, extending nearly to the bottom but leaving a purely cylindrical portion at the very bottom, a tangential inlet such as described for the dusty air, an exit at the center of one end for the purified air and an exit at the other end for the dust, substantially as described.

4. A dust collector composed of a single substantially cylindrical chamber (having slight impediments on its periphery) in which the dust laden air forms a vortex substantially as described, a substantially flat floor having a central dust discharge opening, an air discharge opening at the upper end of the chamber, and an inlet for the dust laden air at the same end, substantially as set forth.

5. In a separating chamber in which the dust laden air forms a vortex or whirling body, one or more spiral ribs on the bottom capable of guiding the dust to the exit orifice, in combination with a series of spikes such as described, whereby large masses of fibrous material passing over those ribs are gradually torn up.

6. In a dust collector, a separating chamber having an orifice for the larger dust in the center of the bottom and numerous smaller perforations in the lower part at some distance from the bottom, whereby the fine dust is separated by the smaller perforations and the larger fibrous material by the main orifice.

7. In a dust collector in which the dust laden air forms a vortex or whirling body, a separating chamber having internal projections extending inward from the peripheral circle in the upper portion of the chamber, in combination with a cylindrical portion immediately adjacent to the bottom substantially as described, whereby the current is checked in the upper portion and the dust caught to some extent and allowed to descend in the angles formed by the obstructions, but is no longer obstructed as it approaches the bottom, and thus at the bottom there is no corner to form accumulations in.

In testimony whereof we have signed our names to this specification in the presence of two subscribing witnesses.

P. VAN GELDER.
W. P. THOMPSON.

Witnesses:
H. P. SHOOBRIDGE,
F. G. GUARDIOLA.